United States Patent [19]

Sugiyama et al.

[11] Patent Number: 4,949,895

[45] Date of Patent: Aug. 21, 1990

[54] PROCESS OF FIXING INTERNALLY TITANIUM-LINED DOUBLED-WALLED TUBING STRUCTURE TO TITANIUM TUBE SHEET

[75] Inventors: Yoshihiko Sugiyama; Tadashi Nosetani; Keizo Namba; Hiromiti Sano, all of Nagoya, Japan

[73] Assignee: Sumitomo Light Metal Industries, Ltd., Tokyo, Japan

[21] Appl. No.: 695,048

[22] Filed: Jan. 25, 1985

[30] Foreign Application Priority Data

Jan. 31, 1984 [JP] Japan ................................. 59-16855

[51] Int. Cl.$^5$ .......................... B23K 31/02; F16L 9/14
[52] U.S. Cl. ..................................... 228/175; 228/183; 285/55; 285/286
[58] Field of Search ....................... 228/175, 131, 183; 29/157.4; 285/55

[56] References Cited

U.S. PATENT DOCUMENTS

| | | | |
|---|---|---|---|
| 3,078,551 | 2/1963 | Patriarca et al. | 228/175 |
| 3,563,713 | 2/1968 | Rudd | 285/21 |
| 4,333,671 | 6/1982 | Holko | 228/175 |
| 4,454,977 | 1/1984 | Aldinger et al. | 228/175 |
| 4,556,240 | 12/1985 | Yoshida | 285/55 |

OTHER PUBLICATIONS

Metals Handbook, Ninth Edition, vol. 6, pp. 69, 572, 1983.

*Primary Examiner*—Richard K. Seidel
*Assistant Examiner*—Samuel M. Heinrich
*Attorney, Agent, or Firm*—Browdy and Neimark

[57] ABSTRACT

A process of fixing a double-walled tubing structure to a titanium tube sheet, the tubing structure comprising a non-titanium outer tube and a titanium inner lining tube, comprising the steps of: pressure-welding a titanium collar to an end face of the outer tube to form an integral titanium end portion at one end of the outer tube; inserting the titanium lining tube in the outer tube and fixing the titanium lining tube to the outer tube in pressed contact with the inner surface of the outer tube to form the titanium-lined double-walled tubing structure; and inserting an end section of the tubing structure in a hole in the tube sheet, and welding the titanium end portion of the outer tube and an end portion of the lining tube to the tube sheet. Instead of the titanium collar being directly welded to the outer tube, an auxiliary collar made of a metal material for sound welding to the outer tube may be pressure-welded at its one end to the titanium collar, and fusion-welded at the other end to the outer tube. In either case, the titanium end portion of the internally titanium-lined double-walled tubing structure is positioned in the hole and welded to the tube sheet.

21 Claims, 3 Drawing Sheets

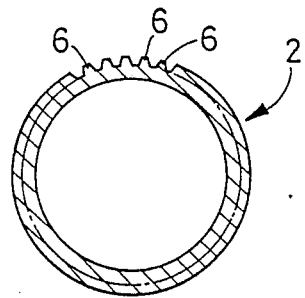
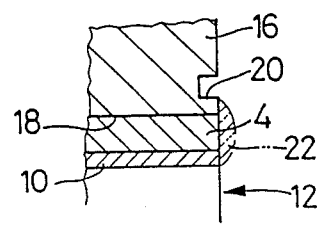
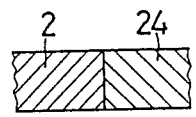
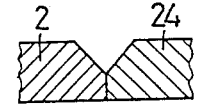
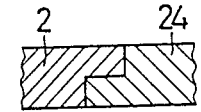
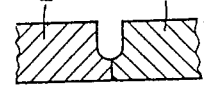

PROCESS OF FIXING INTERNALLY TITANIUM-LINED DOUBLED-WALLED TUBING STRUCTURE TO TITANIUM TUBE SHEET

BACKGROUND OF THE INVENTION

The present invention relates in general to a process of fixing a titanium-lined double-walled tubing structure to a titanium tube sheet, and more particularly to a process by which a double-walled tubing structure comprising a non-titanium outer tube and a thin-walled titanium inner lining tube in pressed contact with the inner surface of the outer tube, is suitably fixed to a titanium tube sheet of an apparatus such as a condenser.

In the art of condensers and heat exchangers, it has been known and attempted to use titanium-lined double-walled tubing or piping structures each of which comprises a non-titanium outer metal tube and a thin-walled, highly corrosion-resistant titanium inner lining tube held in pressed contact with the inner surface of the outer metal tube. For example, there is known a double-walled tubing which is a combination of a finned aluminum outer tube and a thin-walled titanium inner lining tube. The finned aluminum outer tube exhibits high thermal conductivity upon condensation of a working fluid, while the titanium inner lining tube demonstrates high sea-water corrosion resistance. In a condenser using such double-walled tubing structures with the abovementioned properties, there is provided a heat exchanging arrangement wherein sea water or other similarly corrosive fluid (cooling fluid) flows within the internally titanium-lined double-walled tubing, while the outer surface of the tubing is exposed to a stream of a condensable fluid which is not corrosive to an aluminum material of which the outer tube is formed. More specifically, the condensers using double-walled tubing structures of the type described above include: a condenser for power generator using ocean thermal energy (utilizing temperature differential), which employs ammonia or fluoro-carbon as a condensable working fluid; a fluoro-carbon turbine condenser of vertical type; and a liquefying condenser for LNG (liquefied natural gas).

The double-walled tubings used in a condenser are generally mounted on tube sheets which divide the condenser into sections, so that a corrosive cooling fluid such as sea water introduced into these condenser sections flows through the inside of the double-walled tubings fixed to the tube sheets. Since the tube sheets are also exposed to the corrosive cooling fluid, it is preferred that the tube sheets be made of titanium. When titanium tube sheets are used, however, there are some problems that should be solved, associated with the manner of fixing the double-walled tubings to the titanium tube sheets. Described in greater detail, the double-walled tubings are conventionally fixed to the titanium tube sheets, for example, by mechanical diametrical expansion of the double-walled tubing, or by seal-welding technique. These known methods of fixation suffer various drawbacks or inconvenience which follow.

In the case where the titanium-lined double-walled tubing is fixed to the titanium tube sheet by means of mechanical diametrical expansion of the double-walled tubing, each end portion of the tubing inserted in a mounting hole in the tube sheet is mechanically expanded in diameter by suitable means so that the outer surfaces of the tubing are held in pressure contact with the inner surface defining the mounting hole. The fixation by the mere pressed contact between the two members is not sufficient to assure or maintain satisfactory levels of fluid tightness, thermal conductivity, and a reliably high degree of fixing strength. Further, this manner of fixation has a problem that the ends of the outer tube made of aluminum or other metal materials with relatively low corrosion resistance are exposed to the corrosive fluid flowing into the double-walled tubing, whereby the end portions of the tubing tend to be corroded by the fluid. Accordingly, it is necessary to coat the end faces of the double-walled tubing with a suitable anti-corrosion paint, or cover the ends of the tubing with suitable protective caps.

On the other hand, where the double-walled tubing is welded to the tube sheet, the end portion of the titanium-lined double-walled tubing is inserted in the mounting hole in the tube sheet such that a titanium sleeve is interposed between the outer surface of the tubing and the inner surface of the mounting hole, and the end of the double-walled tubing is fusion-welded along its circumference in a seal-welding process. In this manner of fixation, too, the welded end of the tubing made of aluminum or other non-titanium metal with low corrosion resistance is subject to corrosion by the corrosive working fluid. Accordingly, the welded ends of the tubing must be protected as with suitable covers as previously indicated. This protective covering will lead to increase in number of assembling steps, and in assembling time and cost.

SUMMARY OF THE INVENTION

It is accordingly an object of the present invention to provide an improved process suitable for fixing an internally titanium-lined, double-walled tubing structure to a titanium tube sheet.

Another object of the invention is to provide such a fixing process permitting formation of a joint between the tubing structure and the tube sheet, which is significantly improved in fluid tightness, thermal conductivity, fixing strength and reliability, and corrosion resistance.

According to the present invention, there is provided a process of fixing an internally titanium-lined double-walled tubing structure to a titanium tube sheet, the double-walled tubing structure comprising an outer tube made of a metal material different from titanium, and a titanium inner lining tube made of titanium or its alloy and fixed to the outer tube in pressed contact with an inner surface of the outer tube, the process comprising: (a) pressure-welding a titanium collar of a predetermined length made of titanium or its alloy to an end face of the outer tube, and thereby forming an integral titanium end portion consisting of the titanium collar at one end of the outer tube; (b) inserting the titanium inner lining tube in the outer tube including the titanium end portion, and fixing the titanium inner lining tube to the outer tube in pressed contact with the inner surface of the outer tube, to thereby form the internally titanium-lined double-walled tubing structure; and (c) inserting an end section of the doubled-walled tubing structure including the titanium end portion, in a mounting hole formed in the titanium tube sheet, and welding the titanium end portion of the outer tube and an end portion of the titanium inner lining tube corresponding to the titanium end portion, to the titanium tube sheet.

In the process of the invention as described above, the titanium-lined double-walled tubing structure is provided, at the end of its outer tube, with a titanium end portion consisting of a collar made of titanium. That is, the end of the double-walled tubing structure is wholly made of titanium and thus easily welded, in an ordinary manner, to the tube sheet which is also made of titanium. Therefore, the weld joint is formed without formation of any layer of titanium alloy with other metals, whereby the welded assembly of the tubing and the tube sheet is made highly fluid-tight, thermally conductive, and enhanced in fixing strength and reliability.

It is further noted that the welded portion formed as a result of welding substantially consists of titanium, and is consequently substantially free from a problem of corrosion which otherwise takes place due to exposure to a cooling fluid such as sea water. Therefore, the instant process has completely eliminated the conventional need of providing anti-corrosion layers or protective caps to protect the weld joint portion from corrosion.

It is appreciated that the titanium collar be connected to the outer tube via an auxiliary collar made of a metal material suitable for sound welding to the outer tube, rather than directly pressure-welded to the outer tube. In this instance, the auxiliary collar is pressure-welded at one end thereof to the titanium collar, and fusion-welded at the other end to the outer tube so as to form a composite collar section integral with the outer tube. The composite collar section includes an integral titanium end portion consisting of the titanium collar at one end of the composite collar section.

According to one advantageous embodiment of the invention, the end section of the double-walled tubing structure is positioned in the mounting hole of the titanium tube sheet such that an end face of the titanium end portion is flush with the corresponding end of the mounting hole. In the case where the titanium collar is directly welded to the outer tube, the length of the titanium collar is selected such that the weld joint between the titanium collar and the outer tube is located within the mounting hole. In the case where the auxiliary collar is used, the total length of the titanium collar and the auxiliary collar is selected such that the weld joint between the auxiliary collar and the outer tube is located within the mounting hole.

The pressure-welding of the titanium collar or auxiliary collar to the outer tube may be effected by means of friction welding, explosive welding (bonding), ultrasonic welding, resistance welding, diffusion welding, or cold pressure-welding.

According to a further advantageous embodiment of the invention, the process further comprises the step of expanding the welded end section of the double-walled tubing structure in diameter in the mounting hole and thereby fixing the end section in pressed contact with the inner surface of the titanium tube sheet defining the mounting hole, prior to the welding of the end section to the tube sheet.

In accordance with a still further advantageous embodiment of the invention, the process further comprises the step of forming a groove in an end face of the titanium tube sheet so as to surround an open end of the mounting hole corresponding to the titanium end portion of the outer tube. The end section of the tubing structure is welded to a grooved portion of the titanium tube sheet adjacent to the groove.

In the case where the auxiliary collar is used in addition to the titanium tube, the fusion-welding of the auxiliary collar to the outer tube is effected while end faces or edges of the auxiliary collar and the outer tube are butted together.

Alternatively, the edges of the auxiliary collar and the outer tube are prepared so that they have stepped portions engageable with each other, and the fusion-welding of these two members is effected while the stepped portions of the edges are held in abutting engagement with each other.

Alternatively, the edges are prepared such that the edges, when butted together, cooperate to define a V-shaped groove or a U-shaped groove.

In one form of the process wherein the auxiliary collar is used, the auxiliary collar is made of a metal material of which the outer tube is formed.

BRIEF DESCRIPTION OF THE DRAWING

The foregoing and other objects, features and advantages of the present invention will be better understood from reading the following description of the preferred embodiments taken in connection with the accompanying drawing in which:

FIG. 2 is an elevational view in cross section of an outer tube taken along line II—II of FIG. 1;

FIG. 3 is a fragmentary view in enlargement of a portion A indicated in FIG. 1;

FIGS. 5(a), 5(b), 5(c) and 5(d) are fragmentary views of opposite ends of the outer tube and an auxiliary collar, illustrating different types of fusion weld joints.

DETAILED DESCRIPTION OF THE PREFERRED EMBODIMENTS

Referring now to the accompanying drawing, the invention will be more fully described in its preferred embodiments, with the understanding that the invention is not confined to the precise disclosure and that changes and modifications may be made herein which do not affect the spirit of the invention nor exceed the scope thereof as expressed in the appended claims.

Figure 1:
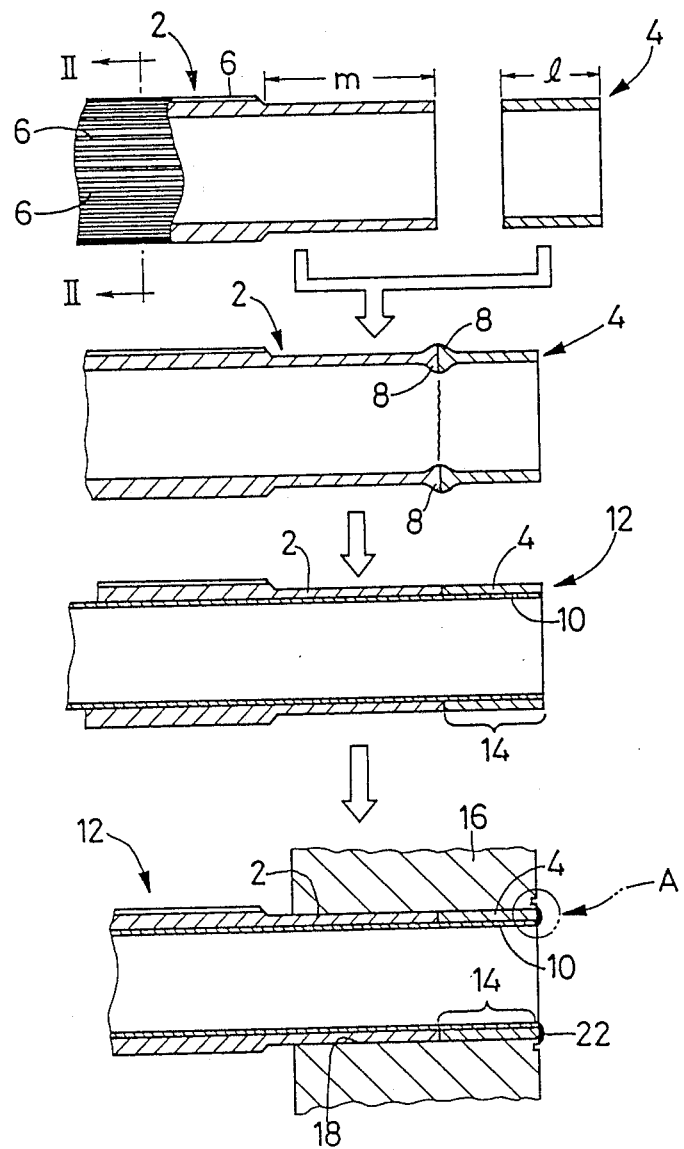
FIG. 1 is a view showing one embodiment of a process of the invention of fixing an internally titanium-lined double-walled tubing structure to a titanium tube sheet.

There is shown in FIG. 1 one embodiment of a process of the invention, wherein reference numeral 2 generally designates an outer tube which serves as an outer tubing element of an internally titanium-lined double-walled tubing structure 12 which will be described. To one end face of this outer tube 2 is fixed a titanium collar 4 of a predetermined length which is made of titanium or its alloy. The fixation of the titanium collar 4 to the outer tube 2 may be achieved in a suitable manner selected from known pressure-welding processes, which include: friction welding; explosive welding (bonding); ultrasonic welding; resistance welding (flash welding and upsetting); diffusion welding; and cold pressure-welding. If necessary, and depending upon the specific pressure-welding process employed, at least the joining surfaces and the adjacent portions of the outer tube 2 and the titanium collar 4 are subjected to preliminary treatments, which include a degreasing step, for example. Thus, the outer tube 2 is provided with an integral titanium end portion which consists of the titanium collar 4 at one axial end of the outer tube.

In the case where the double-walled tubing structure 12 is used as a condensation tubing, it is preferred that the outer tube 2 be provided on its outer surface with a plurality of fins 6 having a suitable height. In this specific embodiment, the fins 6 are formed as integral parts of the tube 2 so as to extend axially of the tube 2 and in mutually spaced-apart relation circumferentially of the tube, as shown in FIG. 2. These axial fins 6 may be replaced by one or more circumferential fins which are spaced from each other axially of the outer tube 2. In any instance, the fins 6 are not provided over a predetermined distance m from the end of the outer tube 2 to which the titanium collar 4 is pressure-welded, so that the double-walled tubing structure 12 may be fixed in a titanium tube sheet 16, which will be described.

The outer tube 2 is made of a suitable material selected from metals different from titanium, i.e., from non-titanium metals which are excellent in thermal conductivity, such as aluminum and its alloys, copper and its alloys, steels, etc.

After the pressure-welding of the titanium collar 4 to the outer tube 2, flashes (or burrs) 8 which are produced, as illustrated in FIG. 1, on the inner and outer surfaces at the weld joint are removed by suitable means, so that the outer and inner surfaces of the end portion m of the outer tube 2 and those of the titanium collar 4 are flush with each other at the welding interface.

For avoiding the formation of an alloy layer at the welding interface or joint of the outer tube 2 and the titanium collar 4, it is effective to interpose a suitable insert medium such as a layer of Ag or Ni between the abutting or joining surfaces of the two members 2, 4. The process of the present invention may include such an auxiliary step for better welding results.

Successively, an inner lining tube 10 made of titanium or its alloy is inserted into the outer tube 2 with the integral titanium end portion 4 (welded titanium collar 4), so that the titanium inner tube 10 constitutes an internal lining of the double-walled tubing structure 12. Then, a pressure, for example, a hydraulic pressure is applied to the inner surface of the inserted inner lining tube 10 so that the inner lining tube 10 is fixed to the outer tube 10 with the outer surface of the inner tube 10 held in pressed contact with the inner surface of the outer tube 2. In this manner, the internally titanium-lined double-walled tubing structure 12 is prepared, wherein a titanium fixing end portion 14 made solely of titanium is constituted over the length l by the titanium end portion 4 (integral titanium collar 4) of the outer tube 2 and the corresponding end portion of the titanium inner lining tube 10 which are held in pressed contact with each other.

The titanium-lined double-walled tubing structure 12 having the titanium fixing end portion 14 is then fixed to the titanium tube sheet 16. Described in greater detail, an end section of the tubing structure 12 including the titanium end portion 14 is inserted in a mounting hole 18 formed through the thickness of the tube sheet 16. The tubing structure 12 is positioned such that an end face of the titanium fixing end portion 14 is flush with the corresponding end of the mounting hole 18. Subsequently, the end of the fixing end portion 14 (end of the titanium collar 4 and the end of the inner lining tube 10) is welded to the corresponding end of the tube sheet 16 in an ordinary welding process such as an arc welding method. Thus, the double-walled tubing structure 12 is fixed to the tube sheet 16.

While the fixation of the double-walled tubing structure 12 to the titanium tube sheet 16 is effected in a known arc welding or other welding process as indicated above, the welding operation is accomplished in situ or in a factory wherein a condenser, for example, is fabricated. In this instance, it is advisable and effective to prepare the edge or end face of the titanium end portion 4 (titanium collar) or form a suitable groove or recess in the end face of the tube sheet 16 adjacent to the end of the mounting hole 18, for achieving an improved weld penetration and for other purposes. Further, it is desired to achieve a melt run of the fusion zone or use a filler metal as needed. In the instant embodiment, the tube sheet 16 is formed with an annular groove 20 as shown in FIG. 3. This groove 20 is cut in the end face of the tube sheet 16 so as to surround the open end of the mounting hole 18. In other words, the annular groove 20 defines an annular portion to which the end of the double-walled tubing structure 12 is fusion-welded as with an arc welding method.

It is appreciated that the end section of the double-walled tubing structure 12 inserted in the mounting hole 18 be expanded radially outwardly with suitable means prior to the welding of the two members 12, 16, so that the inserted end section of the tubing structure 12 is held in pressed contact with the inner surface defining the mounting hole 18.

As discussed hereinbefore, since the double-walled tubing structure 12 is welded to the titanium tube sheet 16, at the titanium fixing end portion 14 which is made solely of titanium, there is produced no brittle alloy layer at a weld joint 22. Stated differently, the weld joint 22 consists essentially of titanium, and is thus highly resistant to corrosion, assuring extremely sound welding of the two members 12, 16, that is, considerable improvement in fluid tightness (pressure tightness), thermal conductivity and fixing strength.

The length of the end section of the tubing structure 12 to be inserted in the mounting hole 18, and the length of the titanium collar 4 are determined so that it is possible to achieve an operation to hold the titanium collar 4 (titanium end portion) in pressed frictional contact with the inner surface of the mounting hole 18. Further, the tubing structure 12 should be positioned relative to the tube sheet 16 such that the weld joint between the titanium collar 4 and the outer tube 2 is located within the length of the mounting hole 18.

Figure 4:
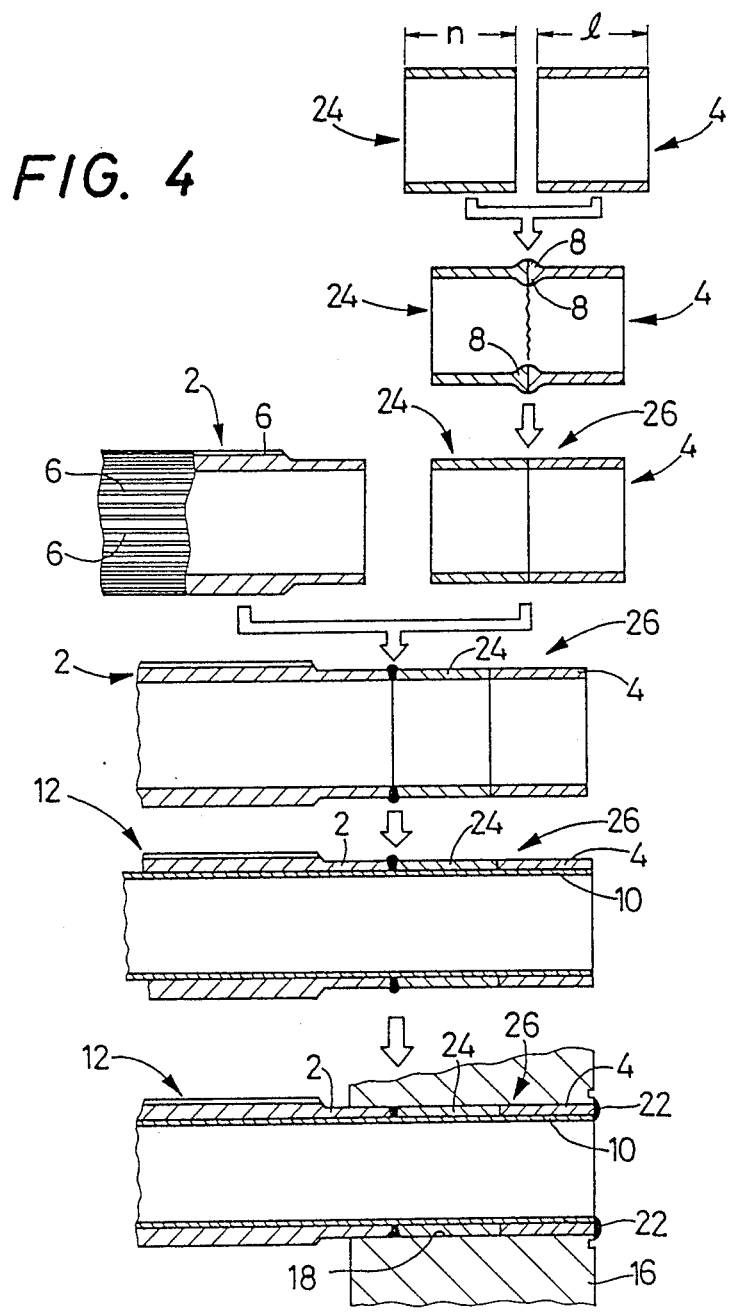
FIG. 4 is a view corresponding to FIG. 1, showing another embodiment of the invention.

Referring next to FIG. 4, there is shown a modified embodiment of the process of the present invention, wherein the titanium collar 4 is not pressure-welded directly to one end of the outer tube 2 as in the preceding embodiment, but fixed to the outer tube 2 via an auxiliary collar 24. This is the primary distinguishing feature of the modified embodiment.

Stated more particularly, the titanium collar 4 is first fixed to one end of the auxiliary collar 24 in a suitable pressure-welding process as previously described. The external and internal flashes 8 produced as a result of the pressure welding are then removed. Thus, a composite collar section 26 integral with the outer tube 2 is formed.

The auxiliary collar 24 pressure-welded to the titanium collar 4 is made of a non-titanium metal material suitable for permitting sound welding to the outer tube 2, usually made of the same metal as that of the outer tube 2.

The composite collar section 26 consisting of the titanium and auxiliary collars 4, 24 which are pressure-welded together, is fusion-welded to one end of the outer tube 2, at the end of the auxiliary collar 24 remote from the titanium collar 4. Apparently, the composite collar section 26 fusion-welded to the outer tube 2 includes a titanium end portion consisting of the titanium collar 4 at one end of the collar section 26. The fusion-welding of the auxiliary collar 24 of the collar section 26 to the outer tube 2 is achieved in a suitable inert-gas-shielded arc welding process such as TIG (tungsten inert gas welding, or inert-gas-shielded tungsten-arc welding) and MIG (metal inert gas welding, or inert-gas-shielded metal-electrode welding), or in a suitable plasma or electron-beam welding process. It will be obvious that the joining portions of the outer tube 2 and the auxiliary collar 24 may be subjected to preliminary treatments as needed, such as a degreasing step.

For enhancing the quality of the double-walled tubing structure 12, it is desired to apply a proper finishing operation to the inner surfaces of the outer tube 2 and the integral composite collar section 26, after the fusion-welding of these members, so as to obtain uniform surface roughness (finish) and reduced variation in inside diameter. Further, it is desired to use a suitable backing jig to prevent the formation of a bead on the inner surfaces of the outer tube 2 and collar section 26 during the fusion-welding thereof. For the prevention of such inner bead, it is also effective to prepare the edges of the outer tube 2 and the auxiliary collar 24 as shown in FIGS. 5(a) through 5(d), which show different types of fusion welds or types of joints. FIG. 5(a) shows a butt joint wherein end faces of the outer tube 2 and the auxiliary collar 24 are simply butted together. FIG. 5(b) shows a kind of groove weld, i.e., edge preparation of the two members 2, 24 such that the edges, when butted together, cooperate to define a V-shaped groove at the joint. FIG. 5(c) shows a kind of lap weld, i.e., edge preparation of the members 2, 24 such that the edges have stepped portions which are engageabale with each other in the form of notches and projections. FIG. 5(d) shows another form of groove weld, i.e., edge preparation of the two members 2, 24 such that the edges, when butted together, cooperate to define a U-shaped groove at the joint. For obtaining a sound fusion weld, it is preferred that the welding be conducted with a stationary welding torch oriented downwardly while the workpieces 2, 26 are rotated about their axes. In the event the circumstances require the welding operation to be performed by moving a welding torch around the stationary workpieces 2, 26, enough cares should be exercised to prevent welding defects such as blow holes.

Thus, the composite collar section 26 is fusion-welded, at the end of the auxiliary collar 24, to the outer tube 2. In other words, the titanium collar 4 is connected to the outer tube 2 via the auxiliary collar 24. Upon completion of this fusion-welding process, the titanium inner lining tube 10 is inserted into the outer tube 2 with the integral collar section 26, and held in pressed contact with the inner surfaces of the outer tube 2 and the integral collar section 26. In this way, the internally titanium-lined double-walled tubing structure 12 is prepared. This tubing structure 12 also has a titanium fixing end portion made solely of titanium, which consists of the titanium collar 4 and the corresponding end of the titanium lining tube 10. That is, the end of the outer tube 2 is not exposed for welding to the tube sheet 16, but the tubing structure 12 is welded at its titanium fixing end portion in an ordinary fusion-welding process. Consequently, a sound weld joint 22 is obtained on the end face of the tube sheet 16 adjacent to the edges of the titanium collar 4 and titanium inner lining tube 10.

In this modified embodiment, too, the length of the end section of the tubing structure 12 to be inserted in the mounting hole 18, and the lengths and n of the titanium and auxiliary collars 4, 24, are suitably selected as previously discussed. In particular, the total length ( plus n should preferably be determined such that the pressure-welding joint between the titanium and auxiliary collars 4, 24, and the fusion-welding joint between the auxiliary collar 24 and the outer tube 2 are both located within the mounting hole 18 in the titanium tube sheet 16.

According to the process of FIG. 4, the titanium collar 4 is pressure-welded to the auxiliary collar 24 of a relatively small length. That is, the process does not require the pressure-welding of the titanium collar 4 directly to the comparatively long outer tube 2 as in the preceding embodiment. This means relatively easy on-the-spot connection of the titanium collar 4 to the end of the outer tube 2, by means of fixing the factory-prepared composite collar section 26 to the outer tube 2 in a fusion-welding process, more particularly, by using a simple arc-welding apparatus, i.e., without requiring the use of special pressure-welding equipment at the site of installation of the tubing structure on the tube sheet 16.

The invention will be further clarified with reference to the following example, which is based on the arrangement shown in FIG. 4. However, it is to be understood that the details of the example will by no means limit the scope of the invention.

EXAMPLE

At first, the titanium collar 4 (made of pure titanium) and the auxiliary collar 24 (made of aluminum alloy: A6063) were prepared, both with an outside diameter of 26.9 mm, an inside diameter of 21.5 mm and a wall thickness of 2.7 mm. These two collars 4, 24 were friction-welded to each other, and the composite collar 26 was obtained. The friction welding was conducted under a friction pressure of 20 kg/cm$^2$, and an upsetting pressure of 20 kg/cm$^2$, and at a rotating speed of 2400 r.p.m. The obtained composite collar 26 was subjected to a step of removing the flashes 8, and other forming steps. As a result, the composite collar 26 was finished to the following dimensions:

Outside diameter: 26.9 mm
Inside diameter: 22.4 mm
Wall thickness: 2.25 mm
Length of titanium collar portion: 20 mm
Length of auxiliary collar portion: 20 mm
Overall length: 40 mm In the meantime, the finned outer tube 2 (made of aluminum alloy: A6063) was prepared with a fin height of 1.35 mm, an outside diameter of 26.9 mm, and an inside diameter of 22.4 mm. The fins 6 were partially removed by taking an external cut of the outer tube 2 over a predetermined distance from its end, so that the outside diameter of the externally cut end portion is 24.2 mm. The edge of this end portion of the outer tube 2, and the edge of the auxiliary aluminum collar 24 of the composite collar 26 were cut so that the abutting edges cooperate to define a U-shaped groove as shown in FIG. 5(d). After the prepared edges of the outer tube 2 and the composite collar 26 were brushed with a wire brush, the edges were butted together, and fusion-welded under the following conditions:

Type of fusion welding: TIG arc-welding (AC current)

Welding position: Downward (with the workpieces rotated)
Welding current: 45–55A
Welding speed: 12 cm/min.
Shielding gas: Argon, 12 liter/min.
Welding rod: A5356BY, 1.6 mm diameter Into the thus prepared finned outer tube 2 with the integral composite collar section 26 including the titanium collar 4 at its end, there was inserted the thin-walled, titanium inner lining tube 10 having an outside diameter of 22 mm and a wall thickness of 0.2 mm. Subsequently, a hydraulic pressure was exerted onto the inner surface of the inner lining tube 10 to hold the inner tube 10 in pressed contact with the inner surface of the outer tube 2. Thus, the titanium-lined double-walled tubing structure 12 was prepared. The end section of the tubing structure 12 was then inserted into the mounting hole 18 (having an inside diameter of 27.1 mm) which was formed through the 50 mm-thickness of the titanium tube sheet 16, as shown in FIG. 4. The tubing structure 12 was positioned so that the end of the collar section 26 (titanium collar 4) was flush with the corresponding end face of the tube sheet 16. In this position, the titanium fixing end (titanium collar 4 and the end of the titanium inner lining tube 10) of the tubing structure 12 was welded, in a shielded-arc welding process, to the annular portion of the tube sheet 16 adjacent to the open end of the mounting hole 18. Prior to the welding, the welded portions were degreased with acetone. The arc welding was conducted under the following conditions:

Type of welding: TIG arc welding (DC welding current)
Welding position: Flat or horizontal (with the welding torch rotated)
Welding current: 40–50A
Welding speed: 20 cm/min.
Shielding gas: Argon, 12 liter/min.
Welding rod: not used The observation of the weld joint 22 obtained from the aforementioned fusion-welding between the end of the internally titanium-lined double-walled tubing structure 12 and the end face of the titanium tube sheet 16, indicated the absence of any brittle alloy layer or any crack at the weld joint 22. Thus, the process in this specific example was found to provide a sound weld joint between the double-walled tubing structure 12 and the tube sheet 12.

What is claimed is:

1. A process for fixing an internally titanium-lined double-walled tubing structure to a titanium tube sheet of a condensor wherein the tubing structure is exposed at its end faces to a corrosive cooling fluid, said double-walled tubing structure comprising an aluminum outer tube made of aluminum or an aluminum alloy, and a titanium inner lining tube made of titanium or a titanium alloy, and fixed to said aluminum outer tube in pressed contact with an inner surface of the outer tube, the tubing structure being fixed to said titanium tube sheet such that an outer surface of said aluminum outer tube is exposed to a condensable working fluid while an inner surface of said titanium inner lining tube is exposed to said corrosive cooling fluid, said process comprising the steps of:

pressure-welding an end face of a titanium collar of a predetermined length made of titanium or a titanium alloy to an end face of said aluminum outer tube, and thereby forming an integral titanium end portion consisting of said titanium collar at one end of said outer tube;

inserting said titanium inner lining tube in the outer tube including said titanium end portion, and fixing the titanium inner lining tube to said outer tube in pressed contact with the inner surface of the outer tube including said titanium end portion, to form said internally titanium-lined double-walled tubing structure; and inserting an end section of said double-walled tubing structure including said titanium end portion, in a mounting hole formed in said titanium tube sheet, and welding said titanium end portion of the outer tube and a corresponding end portion of the titanium inner lining tube to said titanium tube sheet.

2. The process of claim 1, further comprising the step of removing flashes which are produced on the inner and outer surfaces of said outer tube and said titanium collar in the pressure-welding of said titanium collar to form the integral titanium end portion of the outer tube.

3. The process of claim 1, wherein said end section of the double-walled tubing structure is positioned in said mounting hole such that an end face of said titanium end portion is flush with the corresponding end of the mounting hole, the length of said titanium collar being selected such that the weld joint between the titanium collar and the outer tube is located within said mounting hole.

4. The process of claim 1, wherein the pressure-welding of said titanium collar and said outer tube is effected in a process selected from the group consisting of friction welding, explosive welding, ultrasonic welding, resistance welding, diffusion welding and cold pressure-welding.

5. The process of claim 1, further comprising the step of expanding said end section of the double-walled tubing structure in diameter in said mounting hole and thereby fixing said end section in pressed contact with an inner surface of said titanium tube sheet defining the mounting hole, prior to the welding of said end section to said titanium tube sheet.

6. The process of claim 1, further comprising the step of forming a groove in an end face of said titanium tube sheet so as to surround an open end of said mounting hole corresponding to said titanium end portion of the outer tube, said end section of the double-walled tubing structure being welded to a grooved portion of the titanium tube sheet adjacent to said groove.

7. The process of claim 1, further comprising the step of forming a plurality of mutually spaced-apart fins on the outer surface of said outer tube.

8. The process of claim 7, wherein said fins are formed so as to extend axially of the outer tube and spaced from each other circumferentially of the outer tube.

9. A process for fixing an internally titanium-lined double-walled tubing structure to a titanium tube sheet of a condensor wherein said tubing structure is exposed at its end faces to a corrosive cooling fluid, said double-walled tubing structure comprising an aluminum outer tube made of aluminum or an aluminum alloy, and a titanium inner lining tube made of titanium or a titanium alloy and fixed to said aluminum outer tube in pressed contact with an inner surface of the outer tube, said tubing structure being fixed to said titanium tube sheet such that an outer surface of said aluminum outer tube is exposed to a condensable working fluid while an inner surface of said titanium inner lining tube is exposed to said corrosive cooling fluid, said process comprising the steps of:

pressure-welding an end face of a titanium collar of a predetermined length made of titanium or a titanium alloy to one end face of an auxiliary collar of a predetermined length made of a metal material suitable for sound welding to said aluminum outer tube;

fusion-welding the other end face of said auxiliary collar to an end face of said aluminum outer tube, and thereby forming a composite collar section integral with said outer tube, said composite collar section including an integral titanium end portion consisting of said titanium collar at one end of the composite collar section;

inserting said titanium inner lining tube in the outer tube including said composite collar section, and fixing the titanium inner lining tube to said outer tube in pressed contact with the inner surface of the outer tube including said composite collar section, to form said internally titanium-lined double-walled tubing structure; and inserting an end section of said double-walled tubing structure including said composite collar section, in a mounting hole formed in said titanium tube sheet, and welding said titanium end portion of the outer tube and a corresponding end portion of the titanium inner lining tube to said titanium tube sheet.

10. The process of claim 9, further comprising the step of removing flashes which are produced on the inner and outer surfaces of said composite collar section in the pressure-welding of said titanium collar to said auxiliary collar.

11. The process of claim 9, wherein said end section of the double-walled tubing structure is positioned in said mounting hole such that an end face of said titanium end portion is flush with the corresponding end of the mounting hole, the total length of said titanium collar and said auxiliary collar being selected such that the weld joint between the auxiliary collar and the outer tube is located within said mounting hole.

12. The process of claim 9, wherein the fusion-welding of said auxiliary collar to said outer tube is effected while end faces of the auxiliary collar and the outer tube are butted together.

13. The process of claim 9, wherein the fusion-welding of said auxiliary collar and said outer tube is effected after preparing edges of the auxiliary collar and the outer tube such that the edges have stepped portions engageable with each other.

14. The process of claim 9, wherein the fusion-welding of said auxiliary collar and said outer tube is effected after preparing edges of the auxiliary collar and the outer tube such that the edges, when butted together, cooperate to define a V-shaped groove.

15. The process of claim 9, wherein the fusion-welding of said auxiliary collar and said outer tube is effected after preparing edges of the auxiliary collar and the outer tube such that the edges, when butted together, cooperate to define a U-shaped groove at their joint.

16. The process of claim 9, wherein the pressure-welding of said titanium collar and said auxiliary collar is effected in a process selected from the group consisting of friction welding, explosive welding, ultrasonic welding, resistance welding, diffusion welding and cold pressure-welding.

17. The process of claim 9, further comprising the step of expanding said end section of the double-walled tubing structure in diameter in said mounting hole and thereby fixing said end section in pressed contact with an inner surface of said titanium tube sheet defining the mounting hole, prior to the welding of said end section to said titanium tube sheet.

18. The process of claim 9, further comprising the step of forming a groove in an end face of said titanium tube sheet so as to surround an open end of said mounting hole corresponding to said titanium end portion of the outer tube, said end section of the double-walled tubing structure being welded to a grooved portion of the titanium tube sheet adjacent to said groove.

19. The process of claim 9, further comprising the step of forming a plurality of mutually spaced-apart fins on the outer surface of said outer tube.

20. The process of claim 9, wherein said fins are formed so as to extend axially of the outer tube and spaced from each other circumferentially of the outer tube.

21. The process of claim 10, wherein said auxiliary collar is made of a metal material of which said outer tube is made.

* * * * *